2,841,499

COLORED FOOD PRODUCT AND METHOD OF MAKING THE SAME

Frank X. Grossi, St. Louis, Mo., assignor to Union Starch & Refining Company, Columbus, Ind., a corporation of Indiana No Drawing. Application March 3, 1955
Serial No. 492,039

2 Claims. (Cl. 99—148)

This invention relates to a method of coloring food products of the type which are sold as dry powders that are made ready for use by the addition of water and to the product so produced. More particularly the invention relates to a method of coloring such dry food products with caramel coloring.

Heretofore, it has been difficult, if not impossible, to formulate a colored food product such as a jelly, a frosting, ice cream, marshmallow, and other bakers' and confectioners' goods which can be packaged in the dry or powdered state, where the caramel color and/or certified dye does not float out, diffuse unevenly or where some type of color distortion is not evident in the material made from the powdered product. The resultant finished product has no eye-appeal and is similar, in effect, to a streaky paint job.

Among the objects of this invention is to provide a dry food composition comprising caramel color and/or a certified dye which produces, on mixing with water, a product in which the color is thoroughly and evenly distributed throughout the mass of the hydrated product.

Pastes such as starch and casein pastes have been employed as protective colloids in the manufacture of colored food products but such pastes are attacked by some organisms and tend to lose their protective colloid properties when subjected to freezing and thawing.

Among other objects of the invention is to provide a food product containing an evenly dispersed caramel color as a coloring agent in which the product is protected against agglomeration or precipitation of the coloring bodies at extremes of heat and cold to which the food product is normally subjected.

These objects and others ancillary thereto are obtained by thoroughly mixing the caramel color and/or certified dye together with ¼ to 1% of water soluble cellulose ethers to the food product to be colored. The water soluble cellulose ethers are not as readily attacked by organisms as starch or casein, are tasteless and are unaffected by extremes of heat and cold. The invention is particularly adapted to the production of dehydrated food products in dry powdered form. In adding the color and cellulose ether to the dry food products the said compounds can be added prior to dehydrating the food or they can be mixed with the food product after the latter has been dehydrated.

Suitable cellulose ethers include the sodium carboxy methyl cellulose, sodium carboxy ethyl cellulose and the water soluble varieties of methyl and hydroxy ethyl cellulose. The cellulose ether is added in the proportion of ¼ to 1% of the dry solid constituents.

The invention both as to its organization and its method of operation together with additional objects and advantages thereof will best be understood from the following description of specific embodiments thereof:

EXAMPLE 1

A colored frosting was made with the following ingredients:

| | G. |
|---|---|
| Commercial egg white frosting | 50 |
| Sodium carboxy methyl cellulose | ½ |
| Dried caramel color (T. P.=88 approx.) | 2 |
| Amaranth | .025 |

These ingredients were intimately mixed in a mortar and pestle. Thereafter, the product together with 36 ml. of boiling water were mixed with an electric beater such as is available in the home kitchen. After 7 minutes a light brown or chocolate color frosting was obtained with no distortion or separation of color even after 24 hours exposure. The color deepened somewhat due to surface evaporation. The product could be formed into excellent firm peaks with no sagging. There was not a detectable change in taste between uncolored and colored products. The product was of slightly greater firmness than required but it spread very satisfactorily.

EXAMPLE 2

The following dry components were mixed in the proportions set forth:

| | Parts |
|---|---|
| Commercial egg white powdered frosting | 100 |
| Sodium carboxy methyl cellulose | ½ |
| Dried caramel color (T. P.=88) | 6 |
| Amaranth | .075 |

The mixture was whipped with 72 parts by weight of boiling water for 7 minutes to provide a dark brown or dark chocolate frosting which was stable to color distortion and has a slightly less and more desirable firmness than that of Example 1.

EXAMPLE 3

*Chocolate frosting or icing*

| | Parts |
|---|---|
| Cocoa | 14 |
| Powdered egg whites | 20 |
| Invert sugar | 88 |
| Milk (whole) powder | 4¾ |
| Salt | ¼ |
| Gelatine | 3 |
| Cream of tartar | 1 |
| Vanillin to suit. | |
| Carboxymethyl cellulose (sodium salt, high viscosity) | 1½ |
| Dried caramel color (tinctorial power of 88) | 6 |
| Amaranth F. D. & C. No. 2 | 0.075 |

The above ingredients are thoroughly mixed and sieved. The powdered frosting may be packaged 6-oz. to a package which will require about ½ cup of boiling water for mixing. Contents of package are placed into small mixing bowl and beat at top speed until frosting is very stiff.

The abbreviation "F. D. & C." above and throughout the specification refers to the "U. S. Food Drug and Cosmetics" approved food color dyes.

EXAMPLE 4

*Ice cream preparation—powdered*

| | Parts |
|---|---|
| Dried milk | 50 |
| Powdered sugar | 50 |
| Cream of tartar | 4½ |
| Sodium carbonate | 2 |
| Vanillin | 0.06 |
| Unsweetened chocolate | 3 |
| Caramel color (dried, T. P.=88) | 1 |
| CMC—Na (high viscosity) | 0.5 |

Package 4½ oz.=127.5 gms. Stir contents of the package into ½ pint (1 cup) cold milk. Stir until dissolved. Whip ½ pint (1 cup) chilled whipping cream. Add the dissolved ice cream preparation to the cream and mix. Freeze.

EXAMPLE 5

*Orange sherbet (powdered)*

| | Parts |
|---|---|
| Cane sugar | 22½ |
| Corn sugar | 7½ |
| Milk (powdered) | 4 |
| Gelatin | ¾ |
| Orange concentrate | ¼ |
| Amaranth F. D. & C. No. 2 | 1/16 |
| CMC—Na, high viscosity | ¼ |

The above ingredients make 10 gallons of sherbet when quantities are in terms of pounds and dissolved in water.

EXAMPLE 6

*Pudding—Chocolate flavor*

| | Parts |
|---|---|
| Granulated sugar | 60 |
| Corn starch | 23 |
| Cocoa powder | 19 |
| Salt | 1 |
| Vanillin | 3/16 |
| Caramel color, dried, T. P.=88 | 1 |
| CMC—Na, high viscosity | ½ |

Package 4 oz.=112 gms. One package is cooked with one pint of water or milk and stirred constantly until the proper thickening point is reached.

EXAMPLE 7

*Gelatin dessert powder (strawberry)*

| | Parts |
|---|---|
| Granulated sugar | 84 |
| Gelatin powder | 12 |
| Citric acid powder | 2 |
| Natural fruit flavor | 1½ |
| Imitation fruit flavor | 1/100 |
| Amaranth color F. D. & C. No. 2 powder | ¼ |
| Orange F. D. & C. No. 1 powder | 1/16 |
| CMC—Na, high viscosity | ¼ |

Add 17 oz. of above mixture to 5 pints of boiling water. Stir until dissolved.

EXAMPLE 8

*Chocolate fudge (powdered)*

| | Parts |
|---|---|
| Sugar | 17 |
| Glucose | 4 |
| Powdered whole milk | 2 |
| Salt | 1/16 |
| Chocolate | 3/16 |
| Caramel color (dried) | 1/16 |
| CMC—Na, high viscosity | ¼ |

The above ingredients, in terms of pounds, are first dissolved by sifting into 28 gallons of 110–120° F. water with stirring. The mixture is boiled gently to 243° F. Heat is turned off. One (1) lb. of butter is added. Stir well and again boil to 243° F. Grain well by stirring and turn out on manila paper. When cold, cut into slabs or cubes.

EXAMPLE 9

*Chocolate sponge cake mix*

| | Parts |
|---|---|
| Confectioner's sugar | 6 |
| Granulated egg yolk | 1½ |
| Skim milk powder | 1⅞ |
| Baking powder | 7/16 |
| Albumen | ½ |
| Winter wheat flour | 5¼ |
| Salt | 3/32 |
| Cocoa | ⅝ |
| Caramel color (dried, T. P.=88) | ⅛ |
| CMC—Na, high viscosity | ⅛ |

Add nothing but water. Take 12 oz. of lukewarm water and mix with 2 pounds of sponge cake mix and make dough. Then put in machine and beat for 4 minutes. Scale into pans. Bake in a moderate oven.

In the above examples the ingredients are in the dry or powdered form when mixed. The same ingredients can be mixed while one or more of the same are in solution or in the liquid state and then dehydrated to provide the powdered product. The following example illustrates this latter process.

EXAMPLE 10

*Dried powdered marshmallow*

A quantity of 80 grams of corn syrup with a Baumé of 43 and a dextrose equivalent of 42 is heated to 220° F. with 30 grams of cane sugar until a clear syrup is obtained.

While the syrup is still hot and with continuous agitation, 37.5 g. of a solution which contains 1 gram of dried powdered caramel color with a T. P. of about 88 and 1 gram of sodium carboxy methyl cellulose having a viscosity of circa 2000 cp. at a concentration of 1% and a temperature of 25° C. is added thereto.

To the resultant solution a mixture of 1½ grams of gelatin, 1½ grams of powdered egg albumen, vanilla and chocolate flavor (natural and synthetic), and 3 grams of cocoa powder dissolved in 15 ml. of water, is then added, while continuing the agitation.

When the mixture becomes homogeneous, agitation is discontinued and the material is roll dried at a temperature of the rolls of about 250° F. The flaky and friable material is ground up and screened to pass a 100 mesh screen.

The dried powdered marshmallow is packed in units of 8 oz. which when stirred at top speed in a mechanical mixing device for 6 minutes with ½ cup of hot water will yield a chocolate marshmallow.

The caramel color compounds employed in the above examples were the purified or separated caramel color prepared by the process set forth in U. S. Patent No. 2,533,221. Other caramel colors can be employed, however.

The features and principles underlying the invention described above in connection with specific exemplifications will suggest to those skilled in the art many other modifications thereof. It is accordingly desired that the appended claims shall not be limited to any specific feature or details thereof.

I claim:

1. A dry powdered food product adapted to be mixed with aqueous liquid to provide a comestible food, said powdered product consisting essentially of nutritious ingredients, flavor, dry powdered caramel color as a coloring compound and ¼–1.0% of a water soluble cellulose ether.

2. A process of making a powdered food product adapted to be mixed with water to provide an evenly, dark-colored comestible food, comprising providing a dried substantially uncolored or light colored powdered food, thoroughly mixing therewith ¼ to 1.0% of a water soluble cellulose ether and 1–7% of dry powdered caramel color as a coloring agent whereby said cellulose ether acts as a protective colloid to maintain the even distribution of the caramel color in the food product after the latter is mixed with aqueous liquid.

References Cited in the file of this patent

UNITED STATES PATENTS

| | | |
|---|---|---|
| 1,172,113 | Dachert et al. | Feb. 15, 1916 |
| 2,539,457 | Metheny et al. | Jan. 30, 1951 |

FOREIGN PATENTS

| | | |
|---|---|---|
| 501,517 | Canada | Apr. 13, 1954 |